US007264272B2

(12) United States Patent
Mulhern et al.

(10) Patent No.: US 7,264,272 B2
(45) Date of Patent: Sep. 4, 2007

(54) BI-DIRECTIONAL ANTI-TIP SYSTEM FOR POWERED WHEELCHAIRS

(75) Inventors: James P. Mulhern, Nanticoke, PA (US); Michael J. Rozaieski, Drums, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 297 days.

(21) Appl. No.: 11/080,292

(22) Filed: Mar. 15, 2005

(65) Prior Publication Data

US 2005/0206149 A1 Sep. 22, 2005

Related U.S. Application Data

(60) Provisional application No. 60/554,001, filed on Mar. 16, 2004.

(51) Int. Cl.
*B60S 9/00* (2006.01)

(52) U.S. Cl. ...................... 280/755; 180/65.1; 180/907

(58) Field of Classification Search ................ 280/755, 280/647, 47.16, 250.1, 304.1, 5.28; 180/65.1, 180/907
See application file for complete search history.

(56) References Cited

U.S. PATENT DOCUMENTS

| | | | | |
|---|---|---|---|---|
| 3,104,112 | A | 9/1963 | Crail | 280/5.2 |
| 3,520,378 | A | 7/1970 | Slay | 180/21 |
| 3,827,718 | A | 8/1974 | Curry | 280/242 WC |
| 4,000,912 | A | 1/1977 | Donald et al. | 280/701 |
| 4,128,137 | A | 12/1978 | Booth | 180/6.5 |
| 4,245,847 | A | 1/1981 | Knott | 280/5.2 |
| 5,435,404 | A | 7/1995 | Garin, III | 180/6.5 |
| 5,564,512 | A | 10/1996 | Scheulderman | 180/65.5 |
| 5,772,237 | A | 6/1998 | Finch et al. | 280/704 |
| 5,848,658 | A | 12/1998 | Pulver | 180/65.1 |
| 5,855,387 | A | 1/1999 | Gill et al. | 280/283 |
| 5,964,473 | A | 10/1999 | Degonda et al. | 280/250.1 |
| 6,047,979 | A | 4/2000 | Kraft et al. | 280/250.1 |
| 6,070,898 | A | 6/2000 | Dickie et al. | 280/304.1 |
| 6,129,165 | A | 10/2000 | Schaffner et al. | 180/65.1 |
| 6,196,343 | B1 | 3/2001 | Strautnieks | 180/22 |
| 6,234,507 | B1 | 5/2001 | Dickie et al. | 280/304.1 |
| 6,341,657 | B1 | 1/2002 | Hopely, Jr. et al. | 180/6.5 |
| 6,357,793 | B1 | 3/2002 | Dickie et al. | 280/755 |
| 6,460,641 | B1 | 10/2002 | Kral | 180/24.02 |

(Continued)

FOREIGN PATENT DOCUMENTS

| | | |
|---|---|---|
| FR | 2215054 | 8/1974 |

(Continued)

*Primary Examiner*—Paul N. Dickson
*Assistant Examiner*—Drew J. Brown
(74) *Attorney, Agent, or Firm*—DLA Piper US LLP

(57) ABSTRACT

A bi-directional anti-tip system for a wheelchair includes a pair of anti-tip system subassemblies actively lifting a leading anti-tip wheel when traveling in either forward or reverse directions. The anti-tip system subassemblies operate to couple a leading anti-tip wheel to the drive assembly such that pivot motion thereof effects vertical displacement of the leading anti-tip wheel and to decouple a trailing anti-tip wheel from the drive assembly to null pivot motion inputs therefrom. In one embodiment, rheonetic links actively couple and decouple the anti-tip system subassemblies. The system may also include compliant bearings or extensible links for inward displacement of the anti-tip wheel upon impact with a curb.

17 Claims, 9 Drawing Sheets

U.S. PATENT DOCUMENTS

| | | | | |
|---|---|---|---|---|
| 6,533,306 | B2 | 3/2003 | Watkins | 280/340.1 |
| 6,543,798 | B2 | 4/2003 | Schaffner et al. | 280/250.1 |
| 6,554,086 | B1 | 4/2003 | Goertzen et al. | 180/65.1 |
| 6,705,629 | B2 | 3/2004 | Post et al. | 280/250.1 |
| 6,752,230 | B1 | 6/2004 | Huang | 180/209 |
| 6,796,598 | B2 | 9/2004 | Guillez et al. | 280/124.111 |
| 6,851,711 | B2 | 2/2005 | Goertzen et al. | 280/755 |
| 6,923,278 | B2 | 8/2005 | Mulhern et al. | 180/65.1 |
| 6,938,923 | B2 * | 9/2005 | Mulhern et al. | 280/755 |
| 7,021,641 | B2 | 4/2006 | Wu | 280/250.1 |
| 7,055,634 | B2 * | 6/2006 | Molnar | 180/65.1 |
| 7,104,346 | B2 | 9/2006 | Schaffner | 180/65.1 |
| 2002/0093172 | A1 | 7/2002 | Watkins | 280/304.1 |
| 2003/0075365 | A1 | 4/2003 | Fought | 180/6.5 |
| 2004/0004342 | A1 | 1/2004 | Mulhern et al. | 280/304.1 |
| 2004/0035627 | A1 | 2/2004 | Richey et al. | 180/210 |
| 2004/0046358 | A1 | 3/2004 | White et al. | 280/304.1 |
| 2004/0060748 | A1 | 4/2004 | Molnar | 180/65.1 |
| 2004/0168839 | A1 | 9/2004 | Wu | 180/65.1 |
| 2004/0251649 | A1 | 12/2004 | Wu | 280/86.1 |
| 2004/0262859 | A1 | 12/2004 | Turturiello et al. | 280/5.515 |
| 2005/0000742 | A1 | 1/2005 | Mulhern et al. | 180/65.5 |
| 2005/0077694 | A1 * | 4/2005 | Levi et al. | 280/47.16 |
| 2005/0077715 | A1 * | 4/2005 | Mulhern et al. | 280/755 |
| 2005/0127631 | A1 | 6/2005 | Schaffer | 280/124.1 |
| 2005/0206124 | A1 * | 9/2005 | Levi et al. | 280/304.1 |
| 2005/0206149 | A1 | 9/2005 | Mulhern et al. | 280/755 |
| 2006/0022445 | A1 * | 2/2006 | Mulhern et al. | 280/755 |
| 2006/0076747 | A1 | 4/2006 | Pauls et al. | 280/124.11 |
| 2006/0082117 | A1 | 4/2006 | Turturiello et al. | 280/755 |
| 2006/0086554 | A1 | 4/2006 | Jackson et al. | 180/209 |
| 2007/0018418 | A1 * | 1/2007 | Huang | 280/124.111 |
| 2007/0023209 | A1 * | 2/2007 | Wu | 180/65.1 |

FOREIGN PATENT DOCUMENTS

| | | |
|---|---|---|
| FR | 2399822 | 3/1979 |
| GB | 2 051 702 | 5/1980 |
| GB | 2192595 | 1/1988 |
| JP | 2001104391 | 4/2001 |
| WO | 87/06205 | 4/1978 |
| WO | 90/06097 | 11/1989 |
| WO | WO 00/08910 | 2/2000 |
| WO | WO 00/54718 | 9/2000 |

* cited by examiner

BI-DIRECTIONAL ANTI-TIP SYSTEM FOR POWERED WHEELCHAIRS

CROSS-REFERENCE TO RELATED APPLICATIONS

The present application claims priority from U.S. Provisional Application 60/554,001, filed Mar. 16, 2004, which is incorporated herein by reference in its entirety.

FIELD OF THE INVENTION

The present invention relates to anti-tip systems for wheelchairs, and more particularly to a new and useful anti-tip system for providing pitch stability and obstacle-climbing capability.

BACKGROUND OF THE INVENTION

Self-propelled or powered wheelchairs have improved the mobility/transportability of the disabled and/or handicapped. Whereas in the past, disabled/handicapped individuals were nearly entirely reliant upon the assistance of others for transportation, the Americans with Disabilities Act (ADA) of June 1990 has effected sweeping changes to provide equal access and freedom of movement/mobility for disabled individuals. Notably, various structural changes have been mandated to the construction of homes, offices, entrances, sidewalks, and even parkway/river crossing, e.g., bridges, to include enlarged entrances, powered doorways, entrance ramps, curb ramps, etc., to ease mobility for disabled persons in and around society.

Along with these societal changes, the industry has created longer-running and stable power wheelchairs. Various technologies, initially developed for other industries, are being successfully applied to power wheelchairs to enhance the ease of control, improve stability, and/or reduce wheelchair weight and bulk. Innovations have also been made in the design of the wheelchair suspension system, e.g., active suspension systems, which vary spring stiffness to vary ride efficacy, have also been used to improve and stabilize power wheelchairs.

One particular system which has gained popularity/acceptance is mid-wheel drive power wheelchairs, and more particularly, such power wheelchairs with anti-tip systems. Mid-wheel drive power wheelchairs are designed to position the rotational axes of the drive wheels adjacent the center of gravity (of the combined occupant and wheelchair) to provide enhanced mobility and maneuverability. Anti-tip systems enhance stability of the wheelchair about its pitch axis and, in some of the more sophisticated designs, improve the obstacle or curb-climbing ability of the wheelchair. Such mid-wheel drive power wheelchairs having anti-tip systems are disclosed in Schaffner et al. U.S. Pat. Nos. 5,944,131 and 6,129,165, both assigned to Pride Mobility Products Corporation of Exeter, Pa.

While such designs have improved the stability of power wheelchairs, designers thereof are continually being challenged to examine and improve wheelchair design and construction. For example, the Schaffner '131 patent discloses a mid-wheel drive wheelchair having a passive anti-tip system. The passive anti-tip system functions principally to stabilize the wheelchair about its pitch axis, i.e., to prevent forward tipping of the wheelchair. The anti-tip wheel is pivotally mounted to a vertical frame support about a pivot point which lies above the rotational axis of the anti-tip wheel. As such, the system requires that the anti-tip wheel impact a curb or other obstacle at a point below its rotational axis to cause the wheel to "kick" upwardly and climb over the obstacle.

The Schaffner '165 patent discloses a mid-wheel drive power wheelchair having an anti-tip system which is "active" (that is, responsive to torque applied by the drive motor or pitch motion of the wheelchair frame) to vary the position of the anti-tip wheels, thereby improving the wheelchair's ability to climb curbs or overcome obstacles. More specifically, the active anti-tip system mechanically couples the suspension system of the anti-tip wheel to the drive assembly such that the anti-tip wheels displace upwardly or downwardly as a function of the magnitude of: the torque applied by the drive assembly, the angular acceleration of the frame and/or the pitch motion of the frame relative to the drive wheels.

FIG. 1 is a schematic of one variation of the anti-tip system disclosed in the Schaffner '165 patent. The drive assembly for the drive wheel 106 and the suspension for the anti-tip system 110, are mechanically coupled by a longitudinal suspension arm 124, pivotally mounted to the main structural frame 103 about a pivot 108. A drive assembly is mounted to the suspension arm 124 at one end and an anti-tip wheel 116 is mounted to the other. In operation, torque from a drive motor 107 results in relative rotational displacement of the drive assembly 107 about the pivot 108. The relative motion therebetween, in turn, effects rotation of the suspension arm 124 about the pivot 108 in a clockwise or counterclockwise direction, depending upon the direction of the applied torque. Upon an acceleration or increased torque input (as may be required to overcome or climb an obstacle), counterclockwise rotation of the drive assembly 107 will effect an upward vertical displacement of the respective anti-tip wheel 116. Consequently, the anti-tip wheels 116 are "actively" lifted or raised to facilitate such operational modes, e.g., curb climbing. Alternatively, deceleration causes a clockwise rotation of the drive assembly 107, thus effecting a downward vertical displacement of the respective anti-tip wheel 116. The downward motion of the anti-tip wheel 116 assists to stabilize the wheelchair when traversing downwardly sloping terrain or deceleration. Again, the anti-tip system "actively" responds to a change in applied torque to vary the position of the anti-tip wheel.

Another wheelchair suspension/anti-tip system, illustrated in U.S. Patent Application Publication No. 2004/0060748, assigned to Invacare Corporation, employs an arrangement of arms that displace an anti-tip wheel in two directions. A four-bar linkage arrangement is produced to raise the anti-tip wheel when approaching or climbing an obstacle while, at the same time, causing the anti-tip wheel to automatically move rearwardly to alter the angle of incidence of the wheel.

SUMMARY OF THE INVENTION

A bidirectional anti-tip system is provided for a power wheelchair that, when traveling in either forward or reverse directions, actively lifts the leading anti-tip wheel to traverse a curb or obstacle. The system includes a pair of active anti-tip subassemblies mounted to the main structural frame of the wheelchair and disposed on each side of the drive wheels. Each of the subassemblies mounts an anti-tip wheel and is operative to couple the leading anti-tip wheel to the drive assembly such that the pivot motion thereof effects displacement of the leading anti-tip wheel, and decouple the trailing anti-tip wheel from the drive assembly to null pivot motion input therefrom.

In one embodiment of the invention, rheonetic links are employed to actively couple and decouple the subassemblies depending upon whether the forward or rearward anti-tip wheel "leads" the moving wheelchair. Further, a compliant mount may be employed to enable inward displacement of the anti-tip wheel upon impact with an obstacle or curb.

BRIEF DESCRIPTION OF THE DRAWINGS

For the purpose of illustrating the invention, there is shown in the drawings various forms that are presently preferred; it being understood, however, that this invention is not limited to the precise arrangements and constructions particularly shown.

DETAILED DESCRIPTION OF THE DRAWINGS

Figure 2:
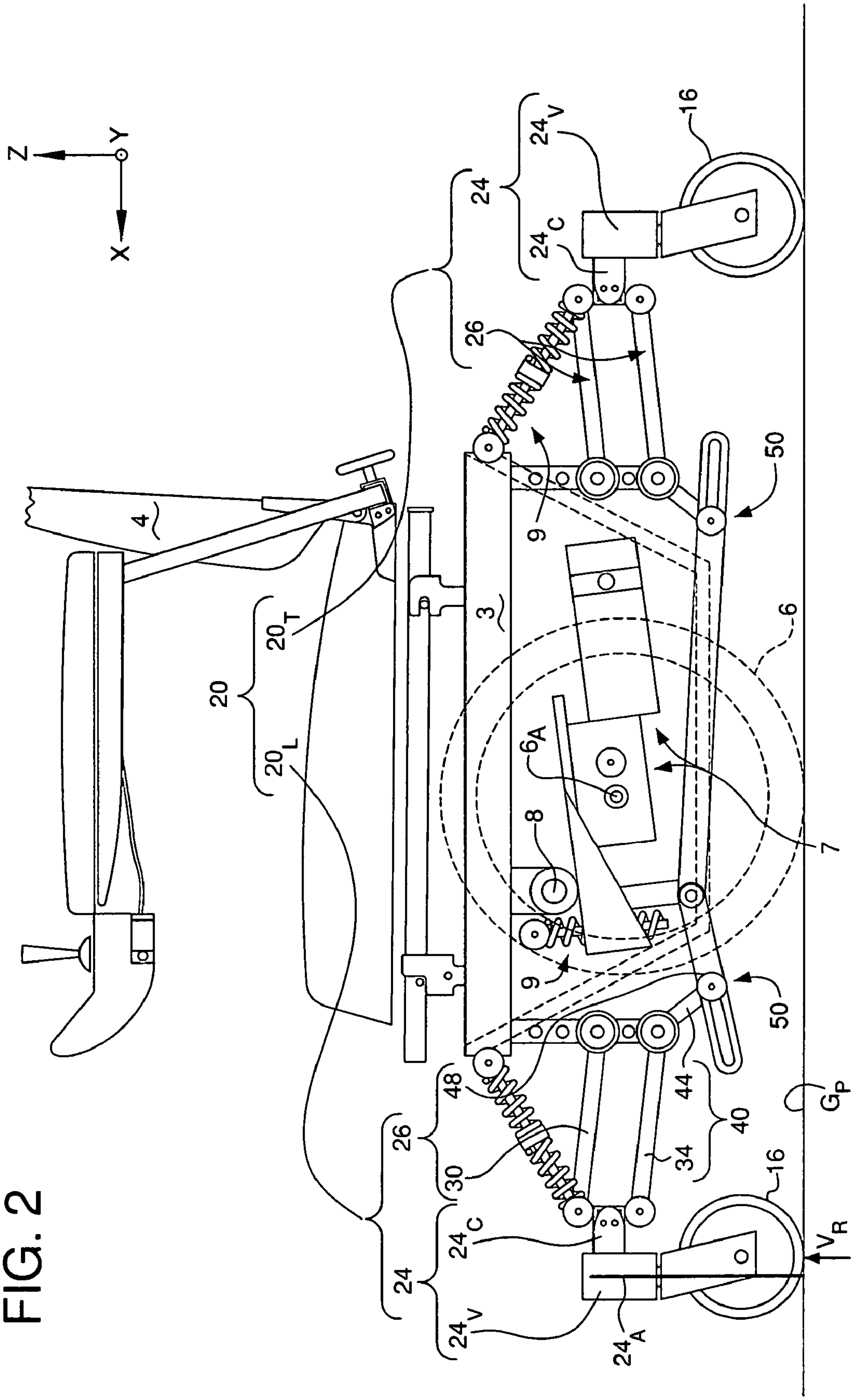
FIG. 2 is a side elevation view of a power wheelchair having a bi-direction anti-tip system according to the present invention, the wheelchair shown with one of its drive-wheels removed and portions of the chassis/body broken-away to more clearly show the relevant internal elements and components.

Referring now to the drawings wherein like reference numerals identify like elements, components, subassemblies etc., FIG. 2 depicts a power wheelchair 2 including a bi-directional anti-tip system 20 according to the present invention. In the described embodiment, the power wheelchair 2 includes, a main structural frame 3, a seat 4 for supporting a wheelchair occupant (not shown), and a pair a drive wheels 6 (shown schematically in the figure). Each of the drive wheels is independently controlled and driven by a drive assembly 7 pivotally mounted to the main structural frame 3 at pivot point 8 to effect relative rotation therebetween in response to torque applied by the drive motor or pitch motion of the frame 3 about an effective pitch axis. The power wheelchair further includes a suspension assembly 9 for biasing the bi-directional anti-tip system 20 to a predetermined operating position.

To facilitate the description, it will be useful to define a coordinate system as a point of reference for certain described geometric relationships including the direction and/or angular orientation of the various anti-tip system subassemblies and components. FIG. 2 shows a Cartesian coordinate system wherein the X-Y plane is coplanar with a ground plane Gp upon which the wheelchair rests. The Y-axis is parallel to the rotational axis $\mathbf{6}_A$ of the drive wheels 6 and is referred to as the "lateral" direction. The X-axis is parallel to the direction of wheelchair forward motion and is referred to as the "longitudinal" direction. The Z-axis is normal to the X-Y plane (or to the ground plane $G_P$) and is referred to as the "vertical" direction.

The bi-directional anti-tip system 20 includes a pair of active anti-tip system subassemblies $\mathbf{20}_L$, $\mathbf{20}_T$ located on opposite sides of the pivot axis 8 of the drive assembly 7. Each assembly includes a rotatably mounted anti-tip wheel 16. In the broadest sense of the invention, each of the active anti-tip system subassemblies $\mathbf{20}_L$, $\mathbf{20}_T$ is operative to raise and lower the "leading" anti-tip wheel vertically in response to torque inputs of the drive assembly 7 while neutralizing (i.e., nulling) the motion of the "trailing" anti-tip wheel. That is, each of the anti-tip system subassemblies $\mathbf{20}_L$, $\mathbf{20}_T$ includes a linkage arrangement for coupling the motion of the drive assembly to the respective anti-tip wheel 16 such that one of the anti-tip system subassemblies $\mathbf{20}_L$, $\mathbf{20}_T$ may be actively engaged while the other are the anti-tip system subassemblies $\mathbf{20}_L$, $\mathbf{20}_T$ is passively disengaged.

As used herein, the term "leading" refers to the anti-tip wheel that leads the wheelchair 2 as it first encounters a curb or obstacle and the "trailing" refers to the other anti-tip wheel that follows the wheelchair. Consequently, reference numerals in the drawings referring to the leading or trailing anti-tip wheel (typically designated by a subscript "L" for leading and "T" for trailing) will change depending upon the direction that the wheelchair 2 travels as it encounters an obstacle.

As described in greater detail below, torque inputs of the drive assembly 7 result in bi-directional pivot motion of the drive assembly 7. That is, the physical manifestation of torque is a pivot motion which is conveyed to the active anti-tip system subassemblies $\mathbf{20}_L$, $\mathbf{20}_T$ to actively displace the leading anti-tip wheel. Alternatively, the anti-tip system could include components or connections that are electronically controlled, rather than responsive to direct physical input. In such a case, torque or directional sensors may be employed to engage or disengage the anti-tip system subassemblies $\mathbf{20}_L$, $\mathbf{20}_T$. Sensors that detect drive wheel direction have been deemed the most reliable way to ensure the bi-directional anti-tip system 20 responds appropriately to a particular requirement. An example of such sensors will be described below in regard to an alternate embodiment of the invention shown in FIG. 5.

Before discussing the wheelchair operation and the functional relationship between the pair of the active anti-tip system subassemblies $\mathbf{20}_L$, $\mathbf{20}_T$, a detailed structural description of each is provided. However, inasmuch as the structure of each is substantially identical, only the forward facing active anti-tip system subassemblies $\mathbf{20}_L$ will be described in detail.

Figure 3A:
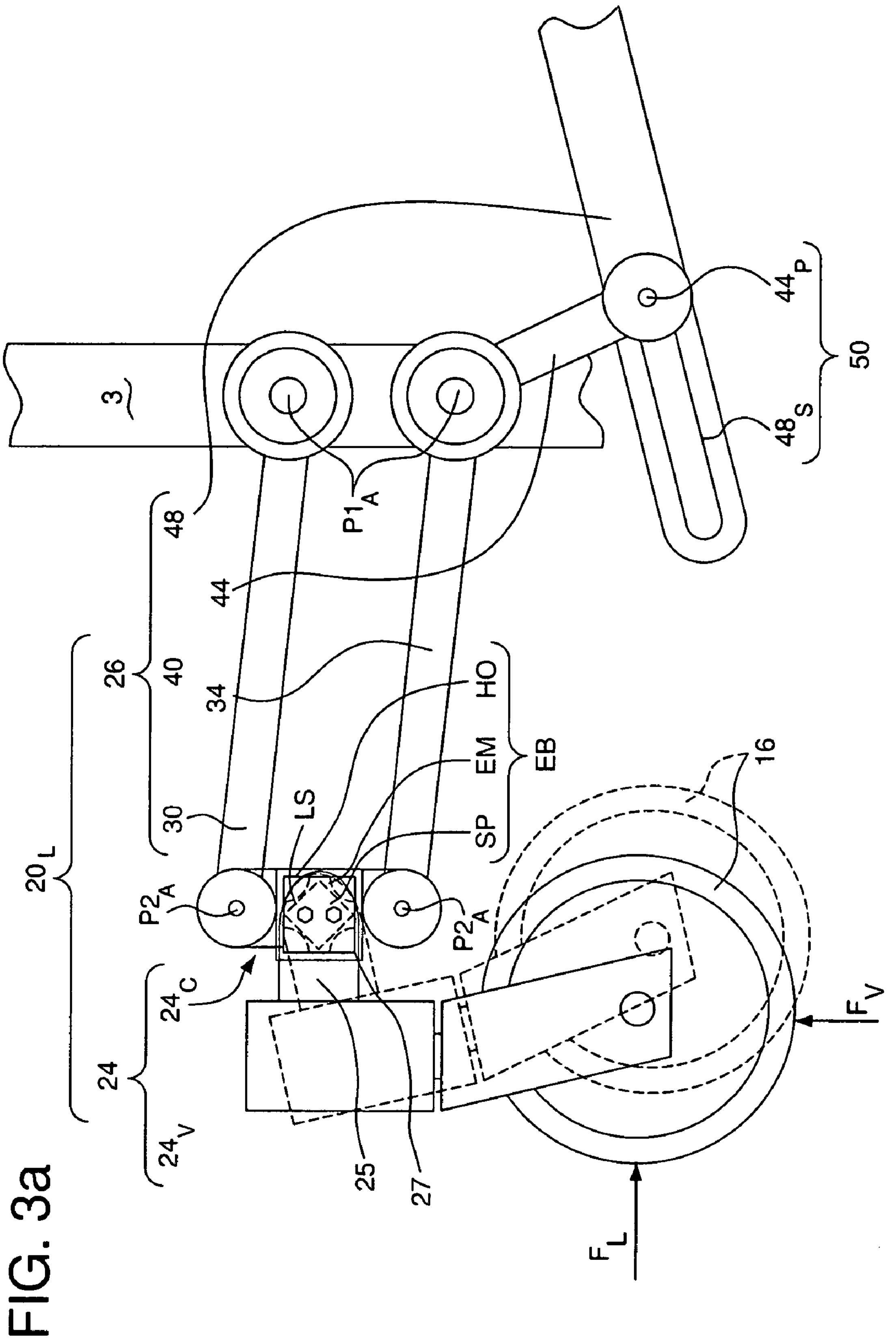
FIG. 3*a* is an enlarged view of a portion of the anti-tip system of FIG. 2 showing a linkage arrangement operative to displace an anti-tip wheel in response to torque inputs of a drive assembly.

In FIGS. 2 and 3*a*, the active anti-tip system subassembly $\mathbf{20}_L$ includes a suspension arm 24 for mounting an anti-tip wheel 16 and a linkage arrangement 26, coupled to the suspension arm 24, for conveying pivot motion of the drive assembly 7 to the anti-tip wheel 16. The suspension arm 24 includes a vertical segment $\mathbf{24}_V$ and, in the preferred embodiment, a compliant segment $\mathbf{24}_C$ having a T-shaped profile configuration. In an alternate embodiment of the invention, shown in FIGS. 6*a* and 6*b*, the suspension arm 24 does not include a compliant segment $\mathbf{24}_C$, but only a vertical segment. Hence, the suspension arm 24 may have other configurations that are structurally adequate to react the anti-tip loads and motions. Such loads and motions will become evident in view of the subsequent discussion.

The vertical segment $\mathbf{24}_V$ has a longitudinal axis $\mathbf{24}_A$ which is substantially vertical relative to a ground plane $G_P$. As used herein, "substantially vertical" means that the longitudinal axis $\mathbf{24}_A$ (see FIG. 2) is within about ±20 degrees of the Z-axis of the coordinate system when the suspension arm 24 is resting in a neutral position under equilibrium. The anti-tip wheel 16 may be fixed or, alternatively, may be castored to enable rotation about the vertical Z axis. The vertical segment $\mathbf{24}_V$ of the suspension arm 24 may also include a vertical post and bearings (not shown) about which the anti-tip wheel 16 pivots to facilitate heading/directional changes.

Referring to FIG. 3*a*, the compliant segment $\mathbf{24}_C$ has a generally T-shaped profile and includes a resilient bearing EB disposed at the intersection/cross between a longitudinal member 25 and a vertical member 27. The bearing EB comprises a polygonally-shaped inner shaft SP, a similarly shaped outer housing HO, and an elastomer material EM disposed therebetween. The elastomer material EM is bonded to the linear surfaces LS of the shaft SP and housing HO. The elastomer member EM is formed by a plurality of elastomer (e.g., rubber) elements that are preferably compressed between the inner shaft SP and the outer housing HO. As such, any lateral force tending to rotate the inner shaft SP relative to the outer housing HO produces deformation of the elastomer material EM. A compliant bearing EB such as the type described above is marketed by Rosta AG under the Tradename "Rubber Suspension System". Dashed lines in FIG. 3*a* show the angular displacement of the suspension arm 24 and longitudinal displacement of the anti-tip wheel 16 caused by a horizontal impact load applied to the anti-tip wheel 16. The advantages associated with use of such resilient bearing EB for effecting longitudinal displacement of the anti-tip wheel 16 will be discussed in greater detail below when describing the operation of the bi-directional anti-tip system 20.

Figure 3B:
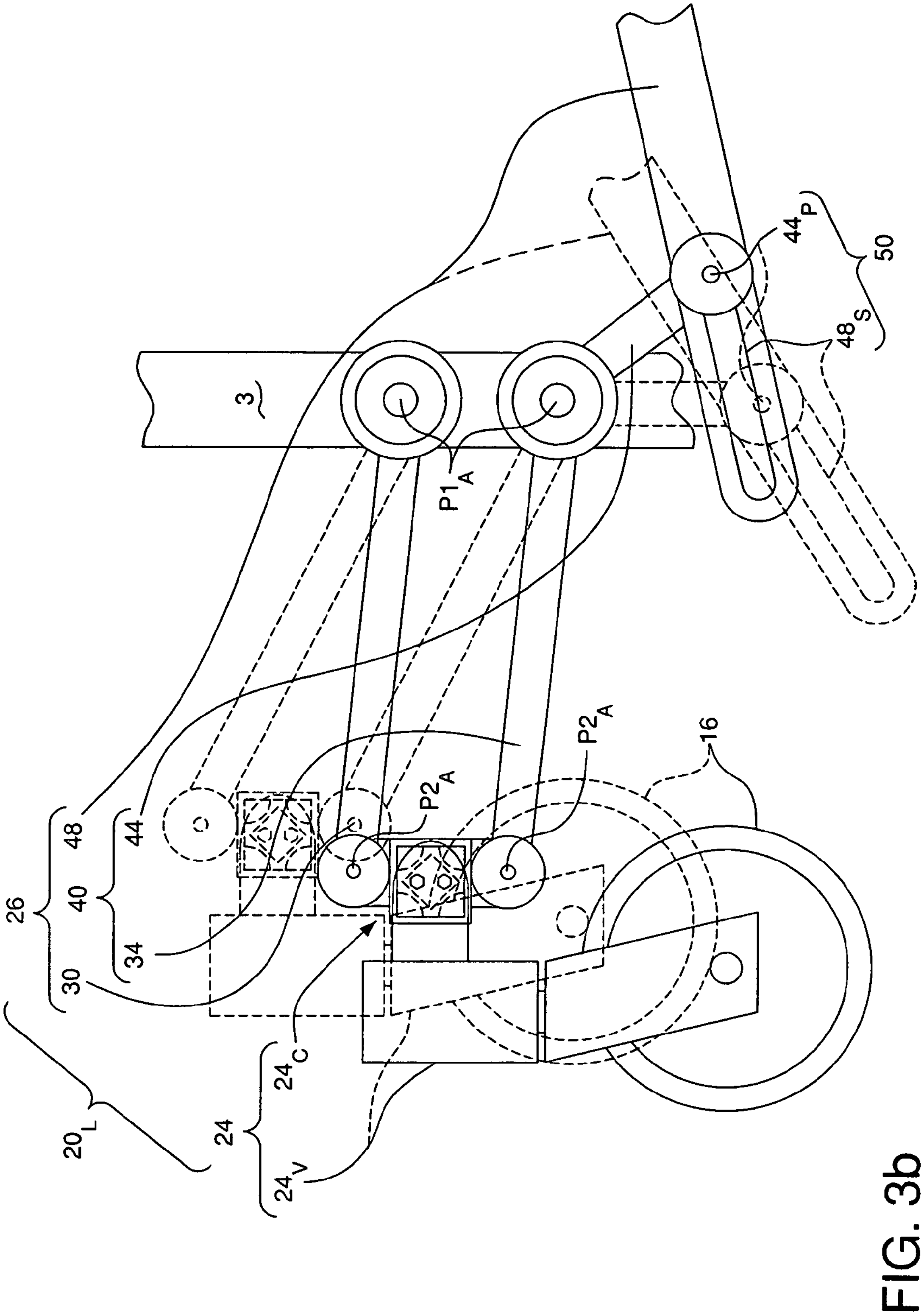
FIG. 3*b* is an enlarged view of the linkage arrangement of FIG. 3*a* showing the links pivoted upwardly in response to torque inputs of a drive assembly.

Referring to FIG. 3*b*, the anti-tip system subassembly $\mathbf{20}_L$ includes a linkage assembly 26 having upper and lower links 30, 34 pivotally mounted to the wheelchair main frame 3 and to the suspension arm 24. More specifically, the links 30, 34 are pivotally mounted at one end to the main structural frame 3 at a first axis $P1_A$ to the main structural frame 3 and at an opposite end to the compliant segment $\mathbf{24}_C$ of the suspension arm 24 at a second pivot axis $P2_A$. As discussed above, the suspension arm 24 may be configured without a compliant segment $\mathbf{24}_C$ such that the links 30, 34 are pivotally mounted directly to a vertical segment of the suspension arm 24.

Preferably, the upper and lower links 30, 34 are substantially parallel and pivot in unison. At least one of the links 30, 34 is caused to rotate in response to torque applied by the drive assembly 7. The linkage assembly 26 has a bell-crank link 40, which includes the lower link 34 as a first crank arm, a fulcrum 42, and a second crank arm 44 defining an angle with respect to the first crank arm 34. The fulcrum 42 is pivotably mounted about the first pivot axis $P1_A$ to the main structural frame 3. A third link 48 is pivotably mounted to a bracket 52, which is rigidly affixed to the drive assembly 7, to transfer or convey the bi-directional motion of the drive assembly 7 to the links 34, 40. The third link 48 is mounted via a slot connection 50 to the second crank arm 44 of the bell-crank link 40 such that the link 48 can pivot and translate relative to the bell-crank link 40. The second crank arm 44 of bell-crank link 40 has a pin $\mathbf{44}_P$ engaging a slot $\mathbf{48}_S$ formed near an end of the third link 48. Dashed lines in FIG. 3*b* show the vertical displacement of the suspension arm 24 and anti-tip wheel 16 as a consequence of the pivot motion of the links 30, 34. Although the anti-tip system subassembly $\mathbf{20}_L$ is shown with a linkage arrangement having three links 30, 34, 48 to convey the rotational motion of the drive assembly 7, it should be understood that a variety of means are available and contemplated to transfer such drive motion.

The bi-directional anti-tip system 20 is biased to a predetermined operating position by the suspension assembly 9. The initial operating position preferably causes the anti-tip wheels $\mathbf{16}_L$, $\mathbf{16}_T$ to be proximate the ground plane. As shown in FIG. 2, the anti-tip wheels $\mathbf{16}_L$, $\mathbf{16}_T$ may be contiguous with the ground plane in the initial operating position. Referring to FIG. 4, the suspension assembly 9 comprises one or more spring-biased strut assemblies 54*a*, 54*b* 54*c*, interposed between the main structural frame 3 and the linkage arrangements $\mathbf{26}_L$, $\mathbf{26}_T$ and/or the drive assembly 7. Functionally, the strut assemblies 54*a*, 54*b* 54*c* bias the position of the linkage arrangements $\mathbf{26}_L$, $\mathbf{26}_T$ such that a force of some threshold magnitude, is required to displace the anti-tip wheels $\mathbf{16}_L$, $\mathbf{16}_T$ upwardly or downwardly. It will be appreciated that a relatively high spring force is desirable to react/prohibit a downwardly directed pitching motion of the main structural frame 3 and seat 4 while a relatively light spring force is desirable to lift the anti-tip wheels $\mathbf{16}_L$, $\mathbf{16}_T$ for curb climbing.

Figure 4A:
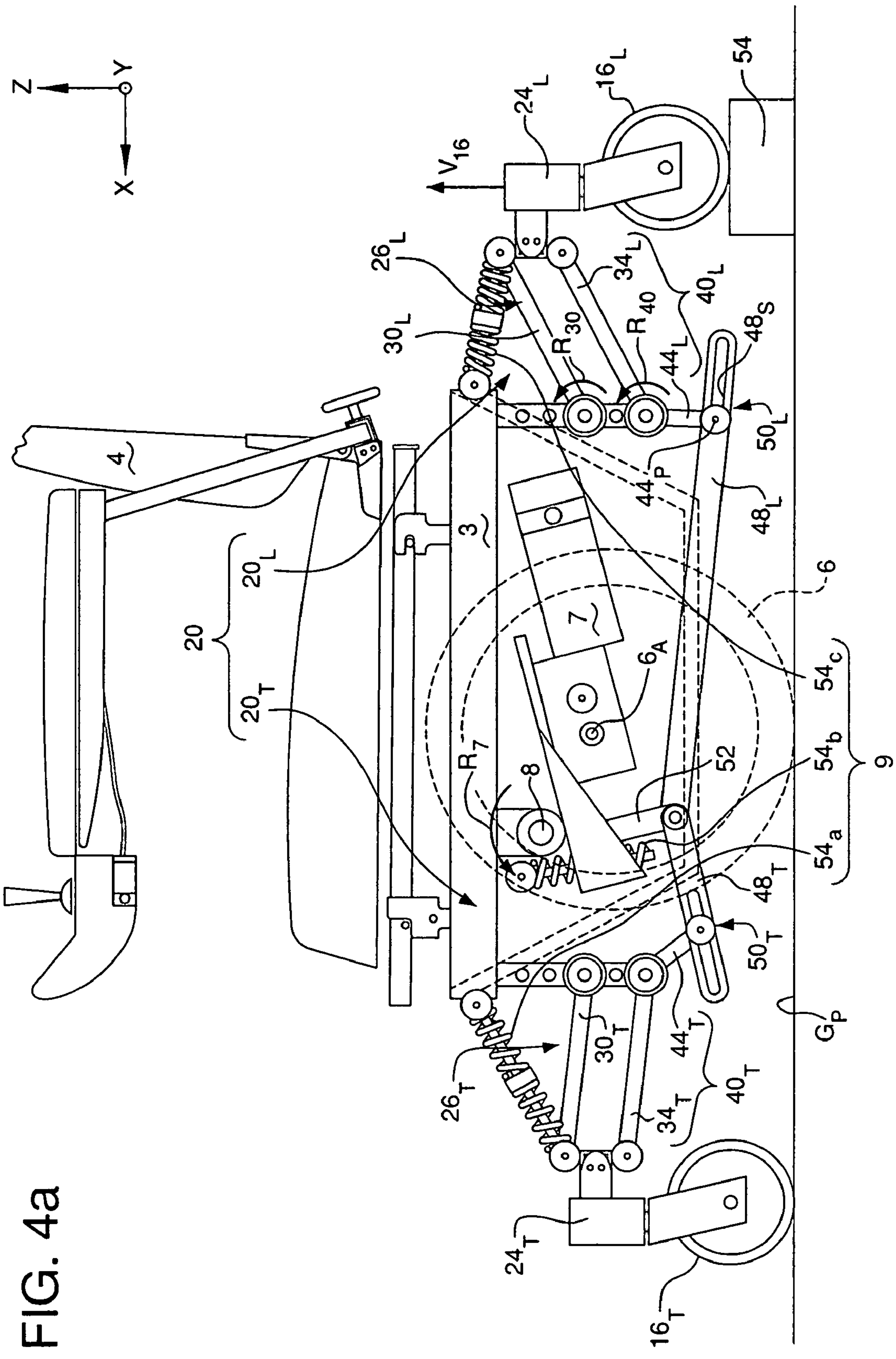
FIG. 4*a* is a side elevation view of the power wheelchair of FIG. 2 traveling in reverse showing the invention raising the "leading" anti-tip wheel.

The bi-directional anti-tip system 20 of the present invention enables each of the anti-tip system subassemblies $\mathbf{20}_L$, $\mathbf{20}_T$ to actively raise one of the anti-tip wheels $\mathbf{16}_L$, $\mathbf{16}_T$ for the purposes of traversing curbs/obstacles while also providing pitch stabilization. That is, the anti-tip system 20 of the present invention actively raises whichever anti-tip wheel $\mathbf{16}_L$, $\mathbf{16}_T$ is "leading" while moving forward or reverse. In the operational mode depicted in FIG. 4*a*, the aft anti-tip wheel $\mathbf{16}_L$ is "leading" as the wheelchair moves rearwardly over a curb 54. Increased torque is applied by the drive assembly 7 to the drive wheels 6 as the wheelchair 2 encounters the obstacle 54. In this mode, the torque applied to the drive wheels 6 causes the drive assembly 7 to rotate in a counter-clockwise direction, in the direction of arrow $R_7$ about pivot point 8. As discussed above, the bracket 52 is mounted to the drive assembly 7 and, therefore, is rotated in a counter-clockwise direction. It will be appreciated that the rotational directions described herein, i.e., clockwise or counter-clockwise, are in relation to the left side views shown in the figures. The counter-clockwise rotation of the bracket 52 drives the third link $\mathbf{48}_L$ rearwardly causing the bell-crank link $\mathbf{40}_L$ to rotate in the same counter-clockwise direction (see arrow $R_{40}$). The slotted connection $\mathbf{50}_L$ engages the bell crank link $\mathbf{40}_L$ to cause the lower link $\mathbf{34}_L$ to rotate upwardly. At the same time, the lower link $\mathbf{34}_L$ causes the upper link $\mathbf{30}_L$ to mirror its motion about arrow $R_{30}$. This motion is conveyed by the upward vertical displacement of the suspension arm $\mathbf{24}_L$. Furthermore, the suspension arm 24 remains vertically oriented while lifting/raising the anti-tip wheels 16 along arrow $V_{16}$. As shown in FIG. 4*a*, the strut assembly 54*c* is compressed because of the rotation of the bell-crank link $\mathbf{40}_L$ while the strut assembly 54*a* remains un-compressed.

At the same time that the linkage assembly $26_L$ of anti-tip system subassembly $20_L$ is actively lifting anti-tip wheel $16_L$, the linkage arrangement $26_T$ of subassembly $20_T$ is decoupled to prevent motion being conveyed to the "trailing" anti-tip wheel $16_T$. The slotted connection $50_L$ associated with the leading anti-tip system subassembly $20_L$ engages to raise the anti-tip wheel $16_L$ while the slotted connection $50_T$ decouples the linkage arrangement of anti-tip system subassembly $26_L$ to null the pivot motion of the drive assembly 7. That is, due to the relative positioning of the pin $44_P$ within the slot $48_S$, the slotted connection $50_L$ transfers motion/drives as the drive assembly 7 pivots in one direction while the other slotted connection $50_T$ remains inactive/idle as the drive assembly 7 pivots in the opposite direction. It will be appreciated that, without such slotted connections $50_L$, $50_T$, the linkage arrangement $26_T$ would drive the anti-tip wheel $16_T$ into the ground plane GP, raise the trailing end of the wheelchair 2 and counteract the curb climbing ability of the leading anti-tip wheel $16_L$.

Figure 4B:
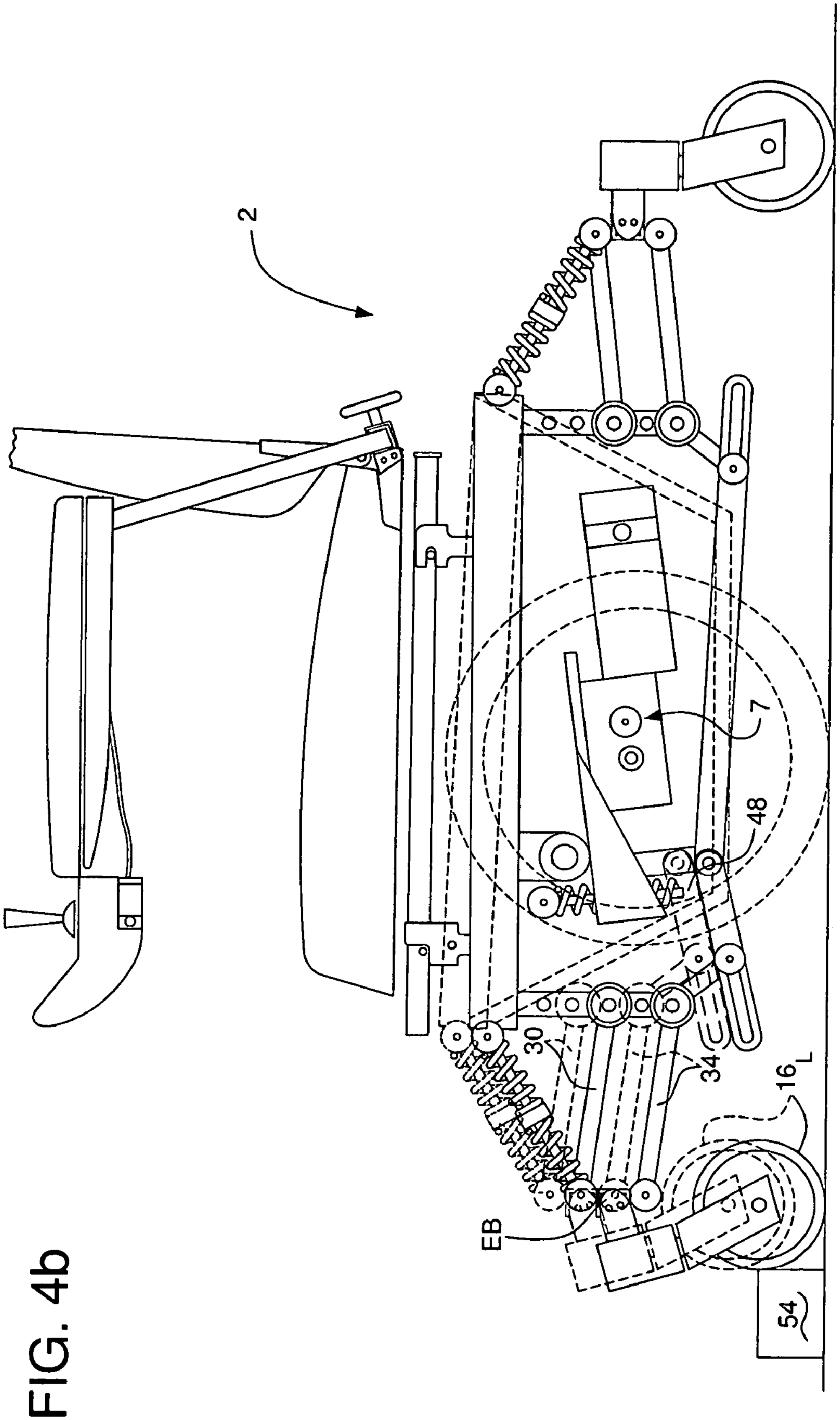
FIG. 4*b* is a side elevation view of the power wheelchair of FIG. 4*a* traveling forwardly with the anti-tip wheel displaced upon impacting an obstacle.

In FIG. 4*b*, the wheelchair 2 is moving forward into contact with a curb 54. The leading anti-tip wheel $16_L$ is now associated with the front end of the wheelchair As shown, the subscript convention is reversed. When traveling over the curb, the resilient bearing EB permits the anti-tip wheel $16_L$ to displace rearwardly before a threshold torque input is reached/commanded to cause the linkage arrangement to actively raise the wheel. Without developing/commanding the threshold torque level, the front end of the wheelchair rises similar to any four-wheeled vehicle with a shock absorbing suspension. That is, the entire front end of the wheelchair (shown in dashed lines) rises without motion assistance of the drive assembly to pivot the links 30, 34, 48. Here, the resilient bearing EB and front end suspension 54*a* inhibit the transmissibility of the peak load, thereby softening the ride.

Figure 4C:
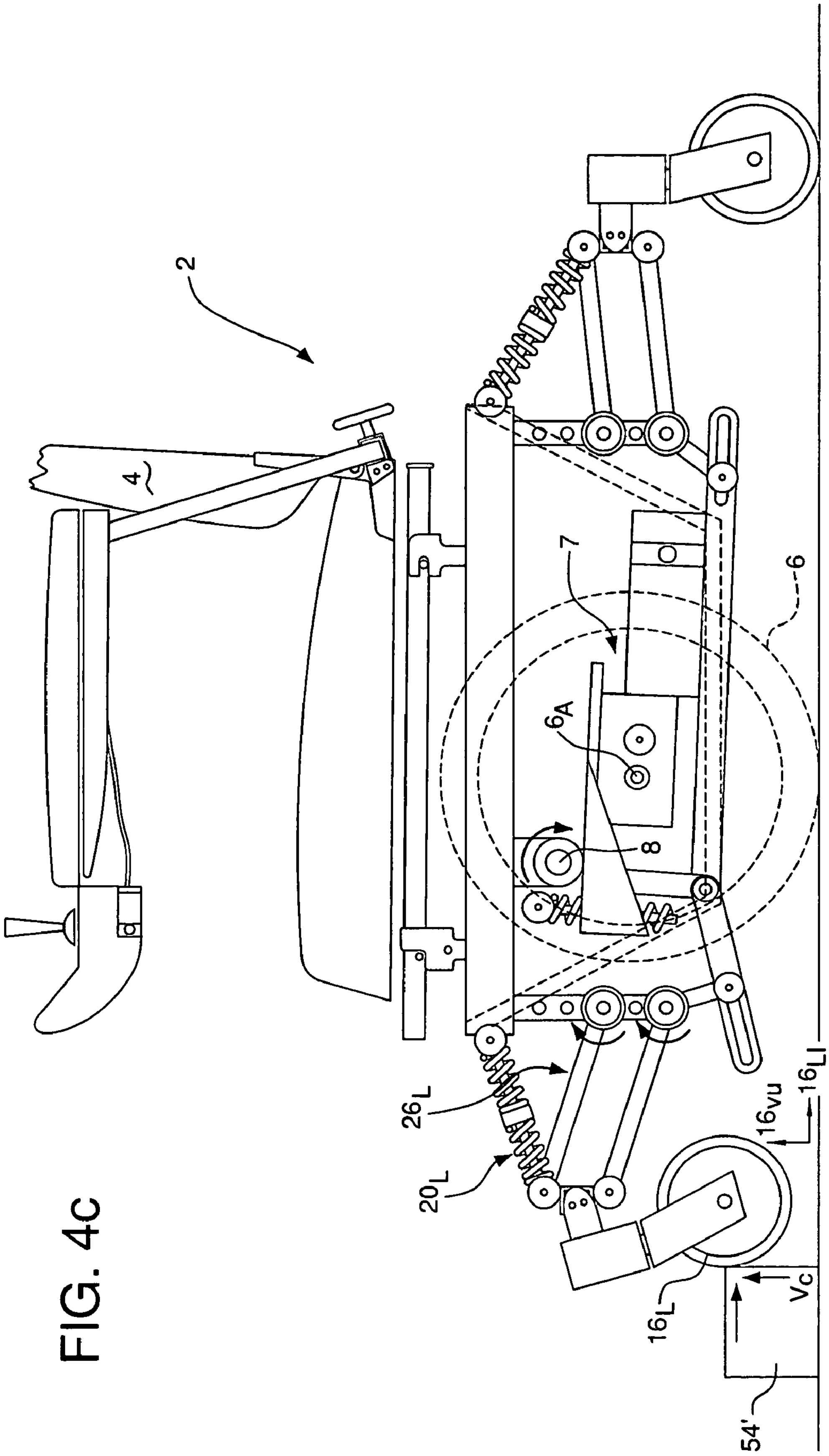
FIG. 4*c* is a side elevation view of the power wheelchair of FIG. 4*a* in an operational mode wherein the leading anti-tip wheel is displaced vertically upward and longitudinally inward as the wheelchair climbs over a curb or obstacle.

In FIG. 4*c*, the same operational mode is shown, however, the torque input level commanded exceeds the threshold and the leading anti-tip subassembly $20_L$ raises the anti-tip wheel $16_L$. Here, the leading anti-tip wheel $16_L$ displaces both vertically and inwardly along arrows $16_{VU}$, $16_{LI}$. While it is readily apparent how the upward travel of the anti-tip wheel $16_L$ improves/expands the operational envelope for curb-climbing, the advantages provided by the resilient bearing EB and the associated inward displacement of the anti-tip wheel is less apparent. The inward displacement changes the angle that the curb 54' impacts or addresses the anti-tip wheel 16 and shortens the distance between the curb 54' and the main drive wheels 6. With respect to the former, a more favorable impact angle can produce a vertical force component $V_C$ capable of pitching the front end of the wheelchair 2 upwardly, over the curb 54. With respect to the latter, by decreasing the distance to the main drive wheels 6, the main drive wheels 6 can engage the curb 54' before the wheelchair 2 begins to lose its forward momentum/inertia.

Figure 5:
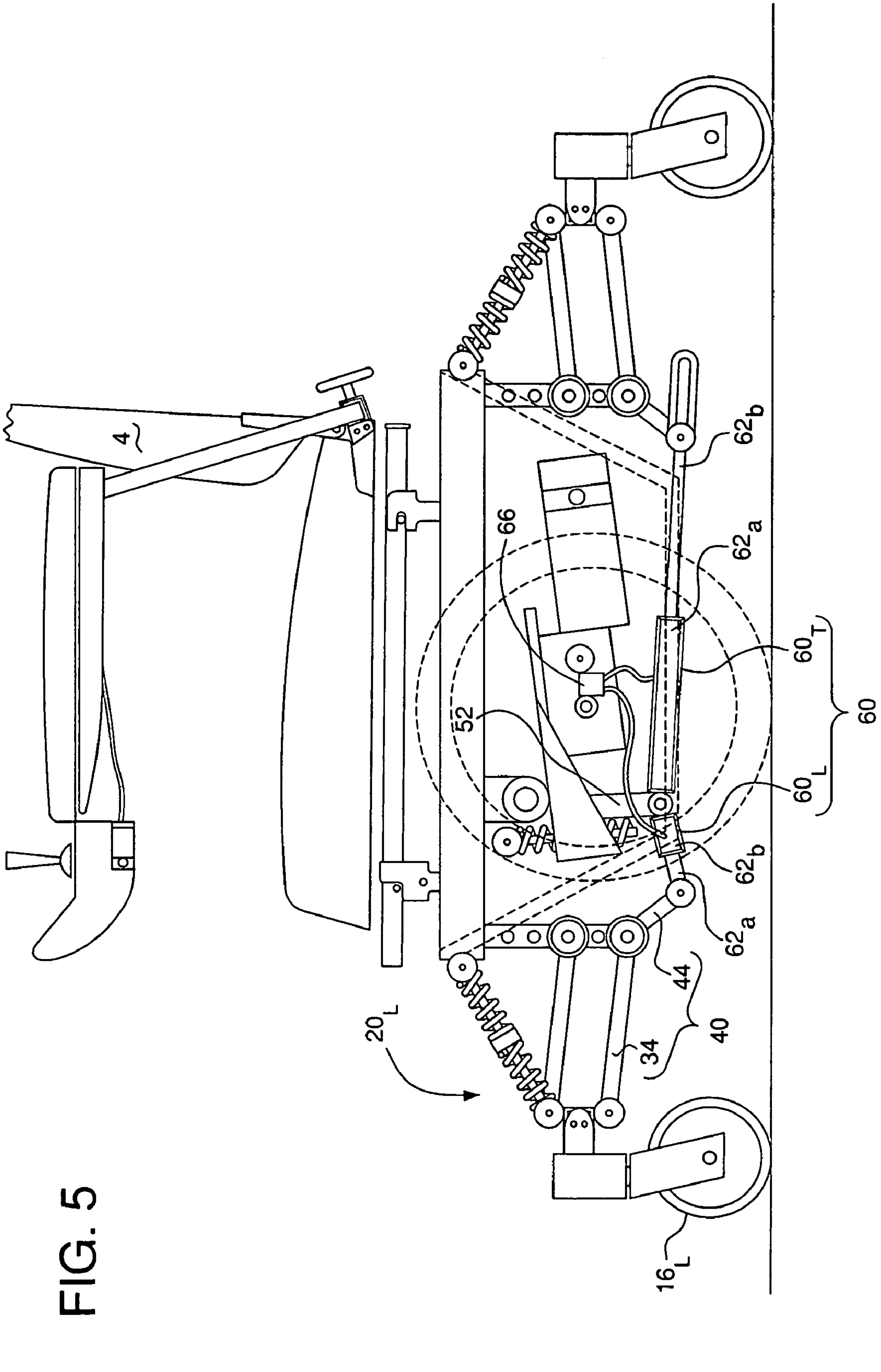
FIG. 5 shows another embodiment of the present invention wherein a rheonetic link serves to couple/decouple the linkage arrangements of the anti-tip subassemblies.

Referring to FIG. 5, an alternate embodiment of the bi-directional anti-tip system 20 is shown wherein the means to couple/decouple the active subassemblies include one or more rheonetic devices 60 or links. The rheonetic devices $60_L$, $60_T$ shown in the described embodiment each include a linear piston/cylinder having link segments 62*a*, 62*b* which connect to either the piston or cylinder of the respective device. The links $60_L$, $60_T$ functionally replace the slotted connections of the earlier described embodiment and, in the described embodiment, the devices $60_L$, $60_T$ are interposed between the bracket 52 and each bellcrank link $40_L$, $40_T$.

Each of the rheonetic links $60_L$, $60_T$ contain a Theological fluid (not shown) which shuttles through a damping orifice (also not shown) within the piston. That is, the piston acts on the Theological fluid so that it shuttles from chamber to chamber, i.e., one side of the piston/cylinder to the other. Each of the rheonetic links $60_L$, $60_T$ also includes electrical windings or other electrical means to generate and control the magnitude of a magnetic field within and around the rheological fluid. The Theological fluid, which contains a suspension of ferromagnetic particles, is responsive to the magnetic field to alter its viscous properties. The viscosity changes therein are proportional to the degree of alignment of the ferromagnetic particles within the fluid. Consequently, as the magnetic field increases or decreases, the fluid viscosity also increases and decreases.

The change in viscosity can be sufficiently great to essentially change the molecular structure from fluid to solid. Hence, the rheonetic links $60_L$, $60_T$ can, on one side of the viscosity spectrum, telescope or slide relative to one another without imparting any force or motion to the other links 30, 40. On the other hand, the rheonetic links $60_L$, $60_T$ can actively lock to engage the link segments 62*a*, 62*b* and produce a unitary, substantially rigid link for transmitting force.

While the slotted connections $50_L$, $50_T$, described in the prior embodiment, must be precisely designed and fabricated to maximize the utility of the bi-directional anti-tip system 20, the rheonetic links $60_L$, $60_T$ are electronically controlled to match the structural requirements of a particular operational requirement. In the described embodiment, a sensor 66 detects the direction of the drive wheel 6 and a controller (not shown) provides inputs to the electrical windings of the rheonetic links $60_L$, $60_T$ indicative of the desired magnitude of the magnetic flux.

Figure 1:
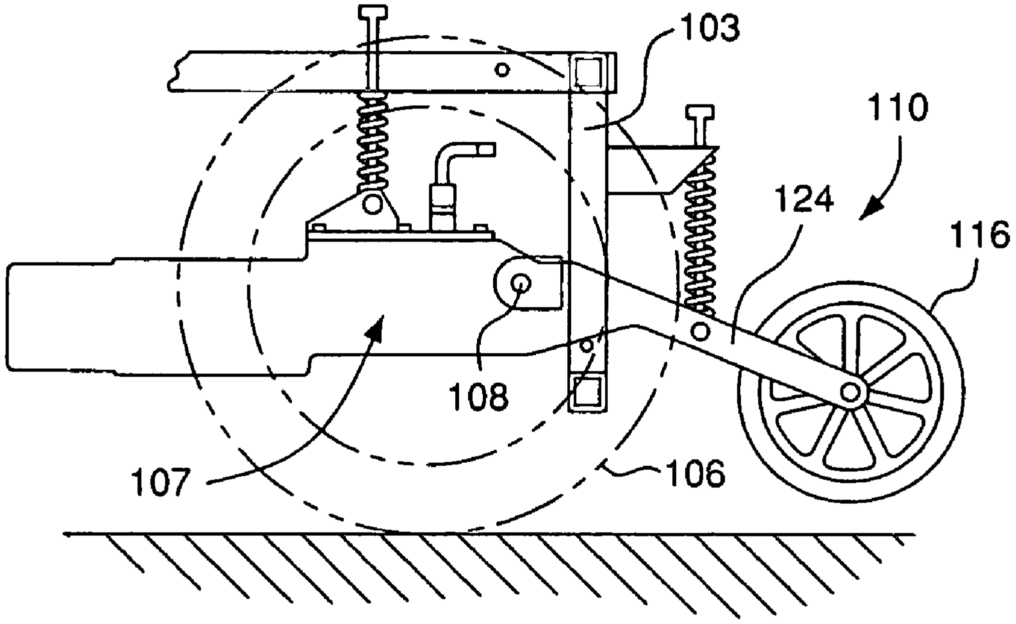
FIG. 1 ( PRIOR ART )
FIG. 1 is a schematic view of a prior anti-tip system for use in power wheelchairs.
Figure 6B:
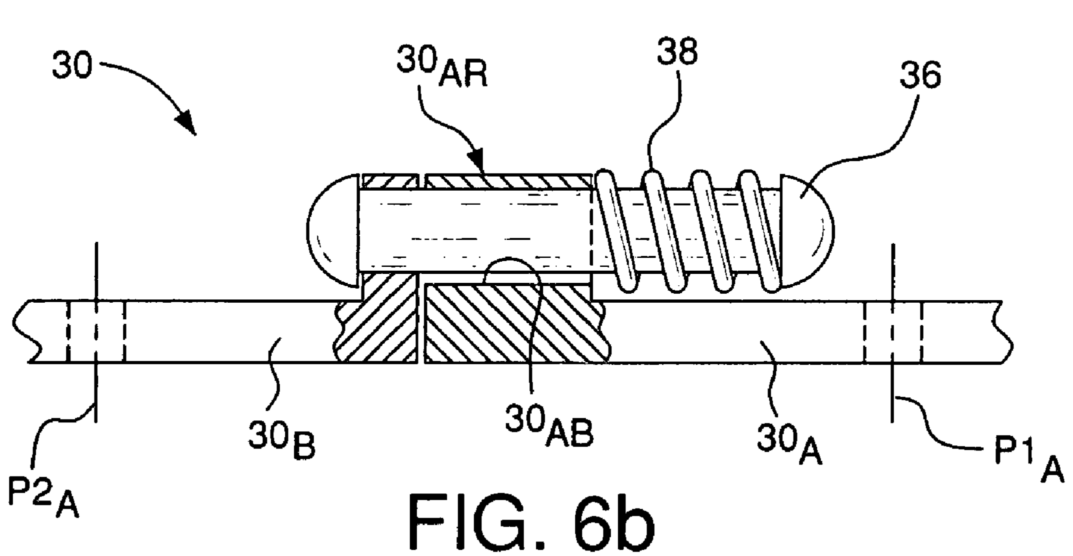
FIG. 6*b* is a view taken substantially along line 6*b*-6*b* in FIG. 6*a*.
Figure 6A:
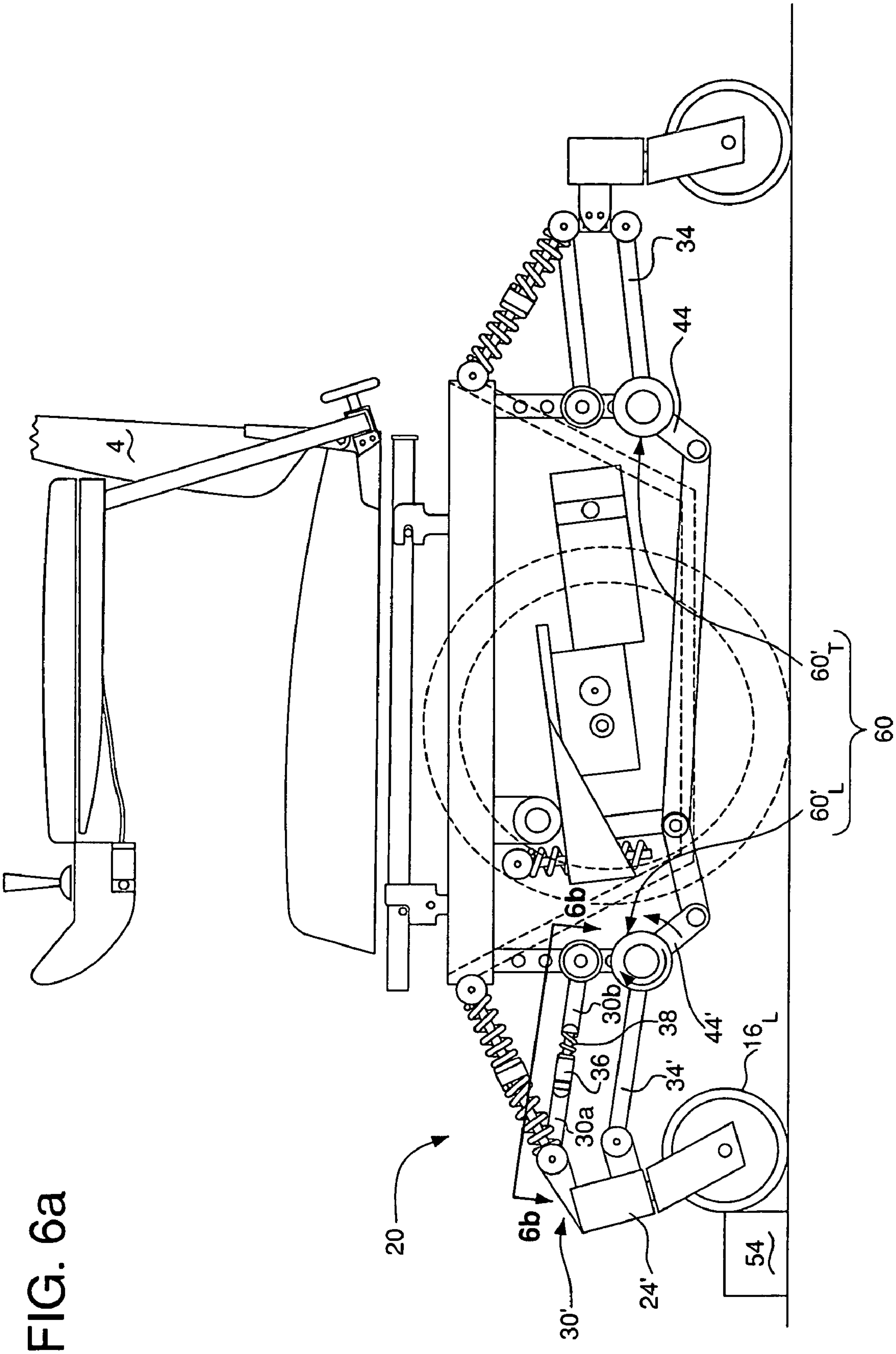
FIG. 6*a* shows a further embodiment of the linkage arrangement wherein an extensible link is employed to facilitate angular displacement of the suspension arm and longitudinal motion of the anti-tip wheel.

Referring to FIG. 6*a*, the rheonetic devices 60 may comprise rotary rheonetic devices located between a lower link 34' and a second link 44' which are each independently pivotable about the lower pivot point $P1_A$. More specifically, rotary rheonetic devices $60'_L$, $60'_T$ including a housing, an internal rotor, and a rheological fluid may be employed between the independently pivotable links 34', 44'. The housing is coupled to one of the links 34', 44' and the internal rotor is coupled to the other of the links 34', 44'. The rheological fluid may be disposed between a closely spaced gap of the housing and internal rotor such that changes in viscosity cause the housing and rotor to rotate freely (i.e., when the fluid has a low viscosity) or to rotate as a unit (i.e., when the fluid is highly viscous). With respect to the latter, when rotating as a unit, the links 34', 44' once again function as a bellcrank link similar to the earlier described embodiment.

Referring to FIGS. 6*a* and 6*b*, the upper link 30' may be extensible and functionally replace the resilient bearing of FIGS. 2-5. That is, similar to the resilient bearing, the extensible link 30' enables angular displacement of a vertical suspension arm 24' and inward displacement of the anti-tip wheel $16_L$. More specifically, and referring to FIG. 6*b*, the upper link 30' includes first and second link segments $30_A$, $30_B$ connected by a spring-biased tension rod 36. The first link segment $30_A$ includes a rod connecting end $30_{AR}$ having a longitudinal bore $30_{AB}$ for accepting and aligning the tension rod 36. Furthermore, a coil spring 38 envelopes a portion of the tension rod 36 and is disposed between the rod connecting end $30_{AR}$ of the first link segment $30_A$ and a first end of the tension rod 36. The second link segment $30_B$ is longitudinally aligned with the first link segment $30_A$ and includes an L-bracket for connecting to the second end of the tension rod 36. Accordingly, the first and second link segments $30_A$, $30_B$ may extend longitudinally by the telescoping motion of the tension rod 36 within the longitudinal bore $\mathbf{30}_{AB}$ and compression of the coil spring 38.

In summary, the bi-directional anti-tip system 20 of the present invention provides active vertical displacement of anti-tip wheels $\mathbf{16}_L$, $\mathbf{16}_T$ on either side of the mid-wheel drive wheelchair 2 to enhance its curb-climbing capability. As such, the wheelchair 2 may travel in both forward and reverse directions without sacrificing the advantages of an anti-tip system on one side of the wheelchair 2. Various connecting means may be employed to couple or decouple the linkage arrangements 26 including a slotted connection or introduction of rheonetic devices 60 (e.g., linear or rotary). Furthermore, the anti-tip system 20 provides an advantageous geometric relationship to enhance the curb and/or obstacle climbing ability of an anti-tip system 20. That is, the anti-tip system 20 employs an adaptable linkage arrangement having a resilient bearing or variable length links to facilitate angular displacement of the suspension arm and inward displacement of the respective anti-tip wheel.

While the bi-directional anti-tip system 20 has been described in terms of embodiments that best exemplify the anticipated use and application thereof, other embodiments are contemplated which also fall within the scope and spirit of the invention. For example, while the various embodiments include anti-tip wheels $\mathbf{16}_L$, $\mathbf{16}_T$ in contact with a ground plane, it will be appreciated that either of the anti-tip wheels $\mathbf{16}_L$, $\mathbf{16}_T$ may be in or out of ground contact depending upon whether a fixed or castored wheel 16 is employed. While a bracket 52, a crank arm 44 and third link 48 are employed for conveying the bi-directional motion of the drive assembly to the parallel links 30, 34, any of a variety of motion conveying devices may be employed. Moreover, while in the preferred embodiment, the adaptable anti-tip system 20 employs a resilient elastomer bearing, the resilient bearing may be any of a variety of compliant bearings interposed between the pivoting links 30, 34 and the suspension arm 24. Further, while an alternate embodiment shows an extensible upper link 30, it will readily be appreciated that either link, i.e., upper or lower, may be extensible or retractable. For example, the anti-tip system 20 may employ a retractable, i.e., telescoping, lower link (not shown) to enable rotation of the suspension arm as a curb impacts the anti-tip wheel.

While the anti-tip wheels 16 are shown mounted to the main structural frame by a linkage arrangement, various other mounting means may be employed for suspending the anti-tip wheels to one side of the wheelchair effective pitch axis. For example, each anti-tip wheel 16 may be mounted to a guide subassembly (not shown) for facilitating or otherwise enabling vertical displacement of each of the anti-tip wheels, i.e., leading or trailing anti-tip wheels.

While a link 48 is shown for connecting and conveying the pivotal motion of a drive assembly to each of the anti-tip wheels in response to applied torque, various connecting means are envisioned. For example, a simple arrangement of gears may be employed to convey the rotational motion of the drive assembly. Furthermore, while slotted links and rheonetic devices are employed to couple and decouple the connecting means, a simple clutching mechanism or actuation device may be employed to engage and disengage the connecting means.

Further, a variety of other modifications to the embodiments will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A wheelchair comprising:

a seat;

a frame supporting the seat;

a pair of drive wheels supporting and mobilizing the frame;

a drive system capable of propelling the wheelchair forwardly and rearwardly, the drive system including a pair of drive assemblies pivotally mounted to the frame at a pivot axis, each said drive assembly applying input torque to one of the drive wheels;

at least one bi-directional anti-tip system including a pair of anti-tip assemblies mounted to the frame and disposed on opposite sides of the drive pivot axis, each of the anti-tip assemblies including an anti-tip wheel, each anti-tip wheel alternately being a leading anti-tip wheel or a trailing anti-tip wheel depending on the direction in which the drive system is propelling the wheelchair, the bi-directional anti-tip system operative to (i) couple the leading anti-tip wheel to one of the drive assemblies such that a pivoting motion thereof effects vertical displacement of the leading anti-tip wheel, and to simultaneously (ii) decouple the trailing anti-tip wheel from the drive assembly to null pivot motion inputs therefrom, and a suspension assembly biasing the anti-tip wheels to a predetermined operating position.

2. The wheelchair according to claim 1, wherein each of the anti-tip assemblies includes a wheel mount rotatably supporting the associated wheel and a bell-crank link pivotably connected to the frame at a pivot axis, the bell-crank link having a first portion connected to the wheel mount and a second portion connected to the first portion at the bell-crank pivot axis, and wherein the anti-tip system includes an actuator link connected to the one of the drive assemblies, the actuator link also connected to the bell-crank link of each anti-tip assembly, the bell-crank link of each anti-tip assembly carrying a pin received in a slot formed in the actuator link to provide sliding motion between the actuator link and the anti-tip assembly when the anti-tip assembly is decoupled.

3. The wheelchair according to claim 1, wherein each anti-tip assembly includes a wheel mount rotatably supporting the associated wheel and a bell-crank link pivotably connected to the frame at a pivot axis, the bell-crank link having a first portion connected to the wheel mount and a second portion connected to the first portion at the bell-crank pivot axis, and wherein the anti-tip system includes an actuator link connected to the one of the drive assemblies, the actuator link having first and second portions each connected to the bell-crank link of one of the anti-tip assemblies, and wherein at least one of the portions of the actuator link comprises a rheonetic device including a cylinder and a piston slidingly received by the cylinder, the rheonetic device having first and second operating states respectively permitting and preventing relative motion between the piston and cylinder to either couple or decouple one of the anti-tip assemblies depending on the operating state of the rheonetic device.

4. The wheelchair according to claim 1, wherein each anti-tip assembly includes a wheel mount rotatably supporting the associated wheel and a link pivotably connected to the wheel mount and to the frame at a link pivot axis, and wherein the anti-tip system includes at least one rotary rheonetic device connected to the link of one of the anti-tip assemblies and supported by the frame at the link pivot axis, the at least one rotary rheonetic device having first and second portions pivotably connected to each other, the at least one rotary rheonetic device having first and second operation states respectively permitting and preventing relative pivot between the first and second portions to either couple or decouple the associated anti-tip assembly depending on the operating state of the at least one rotary rheonetic device.

5. A bi-directional anti-tip system for a power wheelchair having a frame, the wheelchair having a drive system capable of propelling the wheelchair forwardly and rearwardly, the drive system pivotably mounted to the frame, the bi-directional anti-tip system comprising:

a pair of anti-tip assemblies mounted to the frame, each anti-tip assembly including an anti-tip wheel rotatably supported by a wheel mount, the anti-tip wheel of one of the anti-tip assemblies located forwardly of the frame and the anti-tip wheel of the other one of the anti-tip assemblies located rearwardly of the frame, each anti-tip wheel being a leading anti-tip wheel or a trailing anti-tip wheel depending on the direction in which the drive system is propelling the wheelchair, each anti-tip assembly including at least one link pivotably connected to the wheel mount and to the frame for elevating the anti-tip wheel from a normal wheel position; and an actuator assembly connected to each anti-tip assembly and to the drive system, the actuator assembly adapted to simultaneously (i) couple the leading anti-tip wheel to the drive system such that a pivoting motion thereof effects vertical displacement of the leading anti-tip wheel, and (ii) decouple the trailing anti-tip wheel from the drive system to null pivot motion inputs therefrom.

6. A wheelchair comprising:

a frame;

a drive system including a motor capable of propelling the wheelchair forwardly and rearwardly, the drive system mounted to the frame for pivot about a pivot axis in response to a torque generated by the motor, the drive system respectively pivoting in opposite first and second pivot directions from a neutral motor position during forward and rearward propulsion of the wheelchair; and a bi-directional anti-tip system having front and rear anti-tip assemblies each including a wheel rotatably supported by a wheel mount and a linkage including at least one link pivotably connected to the frame and to the wheel mount to elevate the wheel from a normal wheel position when the linkage is pivoted, the front and rear wheels respectively located forwardly and rearwardly of the frame, the anti-tip system also having a linkage actuator pivotably connected to each of the front and rear anti-tip assemblies and to the drive system, the anti-tip system adapted to couple the linkage actuator and the front linkage during pivot of the drive system in the first direction for pivot of the front linkage while simultaneously nulling pivot motion of the rear linkage, the anti-tip system further adapted to couple the linkage actuator and the rear linkage during pivot of the drive system in the second direction for pivot of the rear linkage while simultaneously nulling pivot motion of the front linkage.

7. The wheelchair according to claim 6, wherein the linkage actuator comprises an elongated bar and wherein at least one of the front and rear anti-tip assemblies includes a pin received in a slot of the bar to provide for sliding translation between the linkage actuator and the anti-tip assembly.

8. The wheelchair according to claim 6 further comprising a suspension system supported by the frame to bias the drive system towards the neutral motor position.

9. The wheelchair according to claim 6, wherein the linkage of each of the front and rear anti-tip assemblies includes a pair of substantially parallel links, each pivotably connected at one end to the frame and pivotably connected at an opposite end to a wheel mount member of the anti-tip assembly.

10. The wheelchair according to claim 6, wherein each of the front and rear linkages of the bi-directional anti-tip system includes a bell crank link having a first portion pivotably connected to the frame at one end at a link pivot location and pivotably connected to a wheel mount member at an opposite end, the bell crank link further including a second portion connected to the first portion at the link pivot location, the second portion of the bell crank link connected to the linkage actuator to pivot the linkage when drivingly engaged by the linkage actuator.

11. The wheelchair according to claim 9, wherein the wheel mount member of at least one of the front and rear anti-tip assemblies comprises an elastic bearing including a housing defining an interior, an inner shaft located within the housing interior and at least one elastic element disposed between the shaft and an inner surface of the housing, the associated wheel operably connected to the inner shaft of the elastic bearing.

12. The wheelchair according to claim 9, wherein one of the substantially parallel links is extensible to provide for pivoting of the wheel mount member with respect to the parallel links without pivot of the parallel links with respect to the frame.

13. The wheelchair according to claim 12, wherein the extensible link includes first and second portions and a connecting mechanism, the connecting mechanism including a rod slidingly received in openings defined by each of the first and second link portions, the connecting mechanism also including a spring engaging the rod such that the first and second link portions are biased towards each other.

14. The wheelchair according to claim 6, wherein the normal wheel position for the wheel of each of the front and rear anti-tip assemblies results in contact between the wheel and a substantially level ground surface on which the wheelchair is supported.

15. The wheelchair according to claim 6, wherein the anti-tip system includes at least one rheonetic device having first and second portions connected to each other, the at least one rheonetic device having first and second operating states respectively permitting and preventing relative motion between the first and second portions of the at least one rheonetic device, the at least one rheonetic device arranged to either provide for driving pivot of the linkage of one of the anti-tip assemblies or null pivot movement of the linkage depending on the operating state of the at least one rheonetic device.

16. The wheelchair according to claim 15, wherein the at least one rheonetic device is included in the linkage actuator and wherein each of the at least one rheonetic device is a linear device including a cylinder and a piston slidingly received by the cylinder.

17. The wheelchair according to claim 16, wherein each of the at least one rheonetic device is a rotary rheonetic device having first and second portions arranged for relative pivot between the portions when the at least one rheonetic device is in the first operating state, and wherein the at least one rheonetic device is supported by the frame at a location where a link of one of the front and rear linkages is pivotably connected to the frame.

* * * * *

UNITED STATES PATENT AND TRADEMARK OFFICE

CERTIFICATE OF CORRECTION

PATENT NO. : 7,264,272 B2
APPLICATION NO. : 11/080292
DATED : September 4, 2007
INVENTOR(S) : Mulhern et al.

It is certified that error appears in the above-identified patent and that said Letters Patent is hereby corrected as shown below:

Title Page (Page 2) Item 56

At line 6, change "6,796,598 B2 9/2004 Guillez et al." to --6,796,568 B2 9/2004 Martis et al.--.

Column 7

At line 66, change "Theological" to --rheological--.

Column 8

At line 2, change "Theological" to --rheological--.

At line 7, change "Theological" to --rheological--.

Signed and Sealed this

Eleventh Day of March, 2008

JON W. DUDAS

*Director of the United States Patent and Trademark Office*